Patented July 8, 1952

2,602,821

UNITED STATES PATENT OFFICE 2,602,821

PRODUCTION OF BIS(HYDROXYPHENYL) COMPOUNDS

Daniel B. Luten, Jr., Berkeley, Seaver A. Ballard, Orinda, and Carl G. Schwarzer, Walnut Creek, Calif., assignors to Shell Development Company, Emeryville, Calif., a corporation of Delaware No Drawing. Application July 23, 1951, Serial No. 238,192

20 Claims. (Cl. 260—619)

This invention relates to the production of bis(hydroxyphenyl) compounds and relates more particularly to the production of hydroxyphenyl-substituted alkanes wherein the nuclei of two phenolic radicals are directly attached to a single carbon atom in the alkyl group. A particular aspect of the invention relates to the production of gem(4-hydroxyphenyl)alkanes.

It is known that hydroxyphenyl-substituted alkanes are obtained by the condensation of a phenol with a carbonyl compound, for example, a ketone. The presence of hydrogen chloride is generally relied upon to accelerate the reaction. Under certain specific operating conditions use has also been made of additional secondary catalytic materials. Developments made heretofore in methods for producing these highly desirable compounds has made possible the attainment of relatively high yields. These methods, however, generally are handicapped by severe difficulties often militating against any practical operation of the process on a practical scale. Such difficulties comprise, for example, not only those inherent in operational procedures but also those relating to product impurity.

The nature of the starting materials generally employed in processes disclosed heretofore for the production of bis(hydroxyphenyl) compounds unavoidably results in the formation of an aqueous reaction mixture. The maintenance of substantially anhydrous conditions in such processes is impossible even though the reactants are introduced into the reaction zone in anhydrous state. Water, it has been found, adversely affects the rate of formation of the desired compounds. To maintain the water content of the reaction mixture produced at a minimum it was generally essential heretofore to introduce materials into the reaction zone in substantially anhydrous state. Since practical operation generally necessitates recycling of unconverted materials comprising, for example, hydrogen chloride and unconverted phenol to the reaction zone, costly and difficult dehydrating procedures must be resorted to.

The unavoidable presence of water, in addition to acidic materials such as hydrogen chloride, and phenol, in the reaction mixtures formed in the processes generally available heretofore, seriously complicates the problem of product separation. The corrosive nature of the aqueous reaction mixture often necessitates rapid replacement of apparatus unless use is made of relatively costly materials of construction capable of resisting corrosion. These conditions, directly attributable to the formation of water within the system, adversely affect product quality. Consequently the bis(hydroxyphenyl) substituted alkanes formed by methods disclosed heretofore are often too discolored and impure to enable their use as starting or intermediate materials in many important fields of application, such as in the production of substantially colorless resins.

It is an object of the present invention to provide an improved process enabling the more efficient production of bis(hydroxyphenyl) compounds wherein the above difficulties are obviated to at least a substantial degree and bis(hydroxyphenyl) compounds are produced under substantially anhydrous conditions.

Another object of the invention is the provision of an improved process enabling the more efficient production of hydroxyphenyl-substituted alkanes wherein the nuclei of two phenolic radicals are directly attached to a single carbon atom in the alkyl group.

A more particular object of the invention is the provision of an improved process enabling the more efficient production of hydroxyphenyl-substituted alkanes comprising gem(4-hydroxyphenyl)alkanes.

A still more particular object of the invention is the provision of an improved process enabling the more efficient production of hydroxyphenyl-substituted alkanes comprising gem(hydroxyphenyl)propane. Other objects and advantages of the invention will become apparent from the following detailed description thereof.

In accordance with the invention diphenylol alkanes comprising gem(hydroxyphenyl)alkanes are produced by the interaction of a phenolic compound and a bis(organo-mercapto)methane under acidic conditions.

The class of bis(organo-mercapto)methanes reacted with a phenolic compound to obtain the bis(hydroxyphenyl) compounds in accordance with the invention is represented by the following formula:

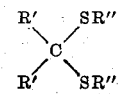
I wherein each R' represents the same or a different member of the group consisting of hydrogen and any monovalent organic radical, aliphatic, cycloaliphatic, aromatic, heterocyclic, including hydrocarbon radicals, such as alkyl, cycloalkyl, aryl, aralkyl, alkaryl, saturated and unsaturated groups and each R'' represents the same or a different member of the group consisting of any monovalent organic radical, aliphatic, cycloaliphatic, aromatic, heterocyclic, including the hydrocarbon radicals, such as alkyl, cycloalkyl, aryl, aralkyl, alkaryl, saturated and unsaturated groups. The radicals R' may be joined together to form a cyclic nucleus including the carbon atom attached to the mercapto radicals SR''. Examples of compounds falling within this class include:

Bis(methylthio)methane
Bis(ethylthio)methane
Bis(propylthio)methane
Bis(butylthio)methane
Bis(octylthio)methane
Bis(phenylthio)methane
Bis(tolylthio)methane
1,1-bis(ethylthio)ethane
1,1-bis(ethylthio)butane
1,1-bis(ethylthio)butene
1,1-bis(ethylthio)propane
1,1-bis(butylthio)propane
1,1-bis(octylthio)butane
Benzyl-bis(benzylthio)methane
2-ethyl-1,1-bis(benzylthio)hexane
Benzyl-bis(diethylthio)methane
2,2-bis(methylthio)propane
2,2-bis(ethylthio)propane
3,3-bis(ethylthio)pentene
2,2-bis(ethylthio)butane
2,2-bis(butylthio)propane
2,2-bis(ethylthio)nonane
5-methyl-2,3-bis(benzylthio)-3-pentene
1-benzyl-1,1-bis(ethylthio)ethane
1-benzyl-1,1-bis(benzylthio)ethane
2,2-bis(benzylthio)propane
Di-benzyl-bis(benzylthio)methane
Bis(ethylthio)cyclohexane
3-methyl-1,1-bis(butylthio)cyclohexane
2-(methylthio)-2-(ethylthio)propane
2-(ethylthio)-2-(butylthio)propane as well as their homologues. A mixture of two or more bis(organomercapto)methanes may be employed as charge to the process. By the term "mercaptol" as used in the present specification and claims attached thereto is meant the class of compounds defined hereinabove by the Formula I

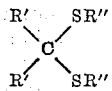

When both of the R's in the Formula I are alkyl groups, the compound is a dialkyl mercaptol as, for example, diethyl mercaptol.

The phenolic compounds reacted with a bis(organo-mercapto)methane in accordance with the process of the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis(hydroxyphenyl)alkanes in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2,6-dimethylphenol, 2-methyl-6-ethylphenol, 2,6 - di - tert - butylphenol, 2,4 - dimethyl - 3 - ethylphenol, 3,5 - diethylphenol, 4-ethylphenol, 2-ethyl-4-methylphenol, 2,3,6-trimethylphenol, 2-methyl-4-tert-butylphenol, 2,4-ditert-butylphenol, 4-methyl-6-tert-butylphenol, 2-tert-butyl-4-methylphenol, 2,3,5,6-tetramethylphenol, o-phenylphenol, p-phenylphenol, the naphthols, phenanthrol, their homologs and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids and the like may serve as the starting phenolic material of the process within the scope of the invention.

Interaction of the above-defined phenolic compounds with bis(organo-mercapto) compounds in accordance with the invention is executed at a temperature in the range of, for example, from about 0 to about 150° C., and preferably from about 20 to about 80° C. When employing normally solid starting materials it is generally preferred to employ a temperature at least sufficiently high to melt the charge or to assure more rapid solution of the normally solid component in any solvent or normally liquid component present. The process of the invention has the advantage, due to the absence of any substantial amount of water in the system, of being able to use the higher temperatures in the prescribed permissible temperature range in the absence of substantial adverse effects upon product purity. Subatmospheric, atmospheric, or superatmospheric pressures may be employed. The use of a pressure in the range of from about atmospheric to a superatmospheric pressure of about 50 pounds per square inch is generally preferred. Preferred times of contact will vary to some extent in accordance with the nature of the materials charged and specific operating conditions employed. A contact time ranging from about 15 minutes to about 60 hours, and preferably from about one hour to about 15 hours, may be employed. Shorter or longer times of contact may, however, be employed within the scope of the invention.

In the process of the invention the phenolic compound may be reacted with the bis(organo-mercapto)methanes in stoichiometric proportions. Greater proportions of the phenolic compound are, however, preferably employed. The mole ratio of phenolic charge to bis(organo-mercapto) compound may range, for example, from about 0.2:1 to about 20:1, and preferably from about 3 to about 6.

The reaction is preferably carried out in the presence of an added acidic agent, for example, hydrogen chloride, preferably in anhydrous state. The hydrogen chloride may be introduced into the system by presaturation of one or both of the reactants therewith, and/or by its direct introduction into the reaction zone continuously or incrementally during the course of the operation. Relatively small amounts of hydrogen chloride suffice to speed up materially the reaction rates. The use of hydrogen chloride in amounts ranging from about 1% to about 30% by weight, and preferably from about 3% to about 10% by weight, based upon theoretical yield of the resulting bis(hydroxyphenyl) compound has been found satisfactory. Greater proportions of hydrogen chloride may, however, be employed within the scope of the invention. Maintenance of a desired concentration of hydrogen chloride in the reaction mixture, particularly at higher temperatures, is facilitated by the use of superatmospheric pressure. Although hydrogen chloride is chosen as the preferred catalytic agent, the invention is in no wise limited to the use of only this material and other acidic agents, such as, phosphoric acid, sulfuric acid, boron trifluoride complexes, p-toluene sulfonic acid, hydrofluoric acid, acid condensing agents and the like may be employed within the scope of the invention. Of these materials the use of any of the strong mineral acids is preferred. Suitable catalytic agents comprise materials capable of liberating an acidic agent in situ under the conditions of operation.

Solvents which are substantially inert under the conditions of execution of the reaction may be present during the reaction. Thus, solvents capable of maintaining all or a portion of the charge or reaction products in solution or in the form of a fluid slurry under the conditions of operation may be used. The phenolic component of the charge may, if desired, be added in excess to function as a solvent for normally solid charge components or for reaction products in those cases where the presence of any substantial amount of these materials in solid form is not desired. Solvents which may be employed comprise, for example: benzene, toluene, xylene, chlorobenzene, carbon tetrachloride, paraffinic hydrocarbons, etc. The added solvent may also function as a means for introducing all or a part of the added hydrogen chloride into the reaction zone.

Under the above-defined conditions the phenolic compounds react with the bis(organo-mercapto) compound to form a reaction mixture comprising hydroxyphenyl-substituted compounds wherein the nuclei of two phenolic radicals are directly attached by carbon-to-carbon linkage to a same single carbon atom in an organic group, as represented by the following formula:

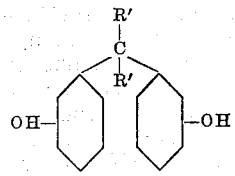

II wherein each R' is the same or a different member of the group consisting of hydrogen and monovalent organic radicals including hydrocarbon radicals, such as alkyl, cycloalkyl, aryl, alkaryl and aralkyl which may be saturated or unsaturated. The phenolic radicals of the product bis(hydroxyphenyl)methanes represented by Formula II above may be further substituted by suitable hydrocarbon radicals such as alkyl, aryl, cycloalkyl, aralkyl and alkaryl. In the Formula II, the radicals R' correspond to the radicals R' of the starting bis(organo-mercapto)methane represented by Formula I above, and each of the phenolic radicals will correspond to the phenolic radical obtained by the removal of hydrogen from a nuclear carbon atom which is in the ortho or para position of the phenol nucleus of the phenolic compound from which the product bis(hydroxyphenyl) compound is derived. By selecting as the phenolic starting material a specific alkyl substituted phenol, bis(hydroxyphenyl) compounds are obtained by means of the present invention having specific alkyl-substituted phenolic radicals which correspond to the alkyl-substituted phenolic radical obtained by the removal of a hydrogen atom from a nuclear ortho or para carbon atom of the phenolic radical in the phenolic compound starting material. The reaction products obtained may comprise isomeric forms of the bis(hydroxyphenyl) compounds. Thus, the interaction of an unsubstituted phenol with a bis(organo-mercapto)alkane will generally result in a reaction product comprising a mixture of bis(4-hydroxyphenyl) alkane and bis(2-hydroxyphenyl)alkane in which the former will generally greatly predominate.

When employing as the phenolic charge to the reaction of the invention a mixture of two or more phenolic compounds the resulting reaction mixture will comprise compounds wherein the phenolic nuclei of two phenolic radicals of different structure are directly attached to a single carbon atom. The two phenolic radicals of differing structure attached to a common carbon atom will correspond to the phenolic radicals obtained by the removal of a hydrogen atom from an ortho or para nuclear carbon atom in the phenolic nucleus of two different phenolic compounds in the mixture used as phenolic starting material.

The bis(hydroxyphenyl)alkanes, or crude reaction products comprising them, produced in accordance with the present invention, are of value as starting or intermediate materials in the production of an extensive array of products comprising, for example, chemical derivatives, pharmaceuticals, resins, plastics, paints, lacquers, varnishes, insecticides, adhesives, textile printing compounds, etc. They are of value as antioxidants and stabilizers in a wide field of application including motor fuels, resins, rubber, synthetic rubbers, plastics and many chemical products. Members of the group lend themselves to use as plasticizers in the processing of natural and synthetic rubbers, resins, plastics and the like. The present invention is of particular value in that it makes possible the efficient and economical productions of gem(hydroxyphenyl) alkanes of specific composition in a high state of purity free of any substantial discoloration, thereby substantially increasing their field of practical application.

Products of value with respect to particular fields of application are obtained by the use as phenolic charge materials of a compound selected from the group consisting of phenol and the alkyl-substituted phenols in which the substituent alkyl groups contain from 1 to 12 carbon atoms, and preferably from 1 to 7 carbon atoms. Products of particular value in certain specific fields of application include these which are obtained when starting with phenol and with alkyl-substituted phenols wherein alkyl-substituent groups contain from 4 to 7 carbon atoms and are linked to the phenolic nucleus through a tertiary carbon atom in the substituent alkyl group.

The specific bis(organo-mercapto)alkane employed as starting material will depend upon the specific bis(hydroxyphenyl)alkane desired and may be governed to some extent by specific operating conditions employed. Thus, the class of bis(organo-mercapto)alkanes represented by the above Formula I used as charge material includes those compounds wherein one or both of the R' radicals may each contain from 0 to 20 carbon atoms. Suitable bis(organo-mercapto) alkanes represented by the above Formula I include those wherein each of the R'' radicals contains from 1 to 10, and preferably from 1 to 4 carbon atoms.

It is to be understood that such reference to preferred sub-groups of compounds within the broad class of permissible starting materials is in no wise made with intent to limit the scope of the present invention, and that the process of the invention is applicable to the use as starting materials of the class of phenolic compounds and bis(organo-mercapto)alkanes set forth broadly herein above.

When reacting a bis(organo-mercapto)alkane represented by the above Formula I wherein both R' are hydrogen with a phenolic compound in accordance with the invention there is obtained a reaction product comprising a bis(hydroxyphenyl)methane wherein two phenolic radicals corresponding to those of the starting phenolic compound are linked to a single methylene group.

Thus, bis(3,5 - dimethyl - 2 - hydroxyphenyl) methane is prepared by continuously bubbling anhydrous hydrogen chloride through a mixture of 2 parts 2,4-dimethylphenol with 1 part bis (ethylthio)methane at a temperature in the range of 25 to 50° C. After a period of 4 to 5 hours the hydrogen chloride introduction is stopped. The resulting reaction mixture is cooled to room temperature and the solidified reaction product separated therefrom by filtration. The solid product separated by filtration is recrystallized using chlorobenzene as solvent. The recrystallized product is found to consist predominantly of bis (3,5-dimethyl-2-hydroxyphenyl)methane.

Similarly, bis(4 - hydroxyphenyl)methane is obtained by the interaction of phenol and bis (ethylthio)methane, and by the interaction of phenol and bis(phenylthio)methane; bis(3-methyl - 5 - tert - butyl - 4 - hydroxyphenyl) methane by the interaction of 2-methyl-6-tert-butylphenol with bis(ethylthio)methane, bis(3-tert-butyl - 5 - methyl - 4 - hydroxyphenyl) methane by the interaction of 2-methyl-6-tert-butylphenol and bis(ethylthio)methane.

When employing as the starting bis(organo-mercapto)alkane one represented by the above Formula I wherein only one R' is hydrogen and the other R' is a hydrocarbon radical, products are obtained comprising a 1,1 - bis(hydroxyphenyl)alkane wherein two phenolic radicals corresponding to the phenolic starting compound are both attached to the same terminal carbon atom of a hydrocarbon group.

Thus, 1,1 - bis(4 - hydroxyphenyl)propane is prepared by mixing phenol and 1,1-bis(ethylthio)propane in a molar ratio of phenol to 1,1 - bis(ethylthio)propane of 4:1. Anhydrous hydrogen chloride is continuously bubbled through the mixture for a period of one to 10 hours without application of heat from an external source. Thereafter the reaction mixture is subjected to steam distillation. Unconverted phenol and reaction products lower boiling than 1,1-bis(4-hydroxyphenyl)propane are taken overhead leaving a normally solid distillation residue consisting predominantly of 1,1-bis(4-hydroxyphenyl)propane.

Similarly prepared are the bis(hydroxyphenyl)methanes set forth in the following Table I using substantially identical conditions as used in the preparation of 1,1-bis(4-hydroxyphenyl)propane, with the exception that in those instances where normally solid starting materials are employed sufficient heat is applied to bring the temperature of the reactants above the melting point thereof. The reference numerals listed in Table I opposite each bis(hydroxyphenyl)-alkane identify the similarly numbered bis-(organo-mercapto)methane in Table II and the similarly numbered phenolic compound in Table III the interaction of which results in the formation of the bis(hydroxyphenyl)alkane.

TABLE I

| Bis(hydroxyphenyl)alkanes | Identification by reference number of compounds similarly numbered in Tables II and III | |
| --- | --- | --- |
| 1,1-bis(4-hydroxyphenyl)ethane | 1 or 2 | 20 |
| 1,1-bis(4-hydroxyphenyl)propane | 3 | 20 |
| benzyl-bis(4-hydroxyphenyl)methane | 4 | 20 |
| 1,1-bis(2,3-dimethyl-4-hydroxyphenyl)propane | 3 | 21 |
| 1,1-bis (3-tert-butyl-6-methyl-4-hydroxyphenyl)propane | 3 | 22 |
| bis(4-hydroxyphenyl)cyclohexylmethane | 5 | 20 |
| 1,1-bis(4-hydroxyphenyl)octane | 6 | 20 |
| 1,1-bis(4-hydroxyphenyl)-2-ethylhexane | 7 | 20 |

TABLE II

*Organo mercapto alkane reactants*

(1) 1,1-bis(ethylthio)ethane
(2) 1,1-bis(butylthio)ethane
(3) 1,1-bis(butylthio)propane
(4) Bis(benzylthio)benzylmethane
(5) Bis(butylthio)cyclohexylmethane
(6) 1,1-bis(ethylthio)octane
(7) 1,1-bis(ethylthio)-2-ethylhexane

TABLE III

*Phenolic reactants*

(20) Phenol
(21) 2,3-dimethylphenol
(22) 2-tert-butyl-5-methylphenol
(23) 2-methyl-6-tert-butylphenol Reaction of a bis(organo-mercapto)alkane represented by the above Formula I wherein both R' are hydrocarbon groups, with a phenolic compound in accordance with the invention, results in products comprising gem(hydroxyphenyl)-alkanes wherein two phenolic radicals corresponding to the phenolic compound used as starting materials are directly linked to a single secondary carbon atom of a hydrocarbon group.

Thus, 2,2 - bis(4 - hydroxyphenyl)propane is prepared by adding 0.227 mole 2,2-bis(n-butylthio)propane dropwise to 0.446 mole phenol at room temperature while bubbling hydrogen chloride gas through the resulting mixture. The temperature of the mixture rises to a maximum of 30° C. After a period of 1½ hours hydrogen chloride addition is stopped. The reaction mixture is cooled to room temperature and solid reaction products separated therefrom by filtration. The solid products separated by filtration are subjected to steam distillation to distill residual phenol and low boiling by-products overhead. The remaining distillation residue is found to consist predominantly of 2,2 - bis(4 - hydroxyphenyl)-propane. A yield of 68% 2,2-bis(hydroxyphenyl)propane, based upon the 2,2-bis-n-butylthio)propane consumed, is obtained.

2,2-bis(4-hydroxyphenyl)propane is prepared by mixing 1.64 moles 2,2-bis(n-butylthio)propane with 6.61 moles phenol. Anhydrous hydrogen chloride is bubbled through the mixture for a period of one hour. The temperature of the reaction mixture remains in the range of from about 20 to 26.5° C. At the end of this period hydrogen chloride introduction is stopped and the resulting reaction mixture distilled. Distillation bottoms obtained consisted predominantly of 2,2-bis(4-hydroxyphenyl)propane. A 94.6% yield of 2,2 - bis(4 - hydroxyphenyl)propane is obtained based upon 2,2-bis(n-butylthio)propane applied.

A reaction mixture comprising 2,2-bis(4-hydroxyphenyl)propane is prepared by reacting 2,2-bis(n-butylthio)propane with phenol under conditions substantially identical with those of the foregoing operation. The reaction mixture is filtered. The solid material separated by filtration is subjected to successive washings with water and octane. The washed solids are steam distilled leaving a still bottoms consisting essentially of 2,2-bis(4-hydroxyphenyl)propane. A yield of 95% 2,2-bis(4-hydroxyphenyl)propane based upon 2,2-bis(n-butylthio)propane applied is obtained.

2,2-bis(4-hydroxyphenyl)propane is prepared by mixing phenol and 2,2-bis(ethylthio)propane in equimolar amounts and passing hydrogen chloride gas through the mixture for a period of 6½ hours at room temperature. The resulting reaction mixture is subjected to distillation leaving a still bottoms comprising 2,2-bis(4-hydroxyphenyl)propane. A yield of 53% of 2,2-bis(4-hydroxyphenyl)propane is obtained.

Similarly prepared by interaction of a phenolic compound with a bis(organo-mercapto)alkane are the gem(hydroxyphenyl)alkanes set forth in the following Table IV. The reference numerals listed in Table IV opposite each bis(hydroxyphenyl)alkane identify the similarly numbered bis(organo-mercapto)methane in Table V and the similarly numbered phenolic compound in Table III, the interaction of which results in the formation of the bis(hydroxyphenyl)alkane.

TABLE IV

| Bis(hydroxyphenyl)alkanes | Identification by reference number of compounds similarly numbered in Tables V and III | |
|---|---|---|
| 2,2-bis(4-hydroxyphenyl)propane | 30-32 | 20 |
| 2,2-bis(2,3-dimethyl-4-hydroxyphenyl)propane | 30-32 | 21 |
| 2,2-bis(3-tert-butyl-6-methyl-4-hydroxyphenyl)propane | 30-32 | 22 |
| 2,2-bis(hydroxyphenyl)-2-phenylethane | 33 | 20 |
| bis(hydroxyphenyl)diphenylmethane | 34 | 20 |
| 2,2-bis(hydroxyphenyl)-2-cyclohexylethane | 35 | 20 |
| 3,3-bis(hydroxyphenyl)pentane | 36 | 20 |
| 2,2-bis(3-methyl-5-tert-butyl-4-hydroxyphenyl)propane | 31 | 23 |

TABLE V

*Organo-mercapto alkane reactants*

(30) 2,2-bis(benzylthio)propane
(31) 2,2-bis(butylthio)propane
(32) 2,2-bis(ethylthio)propane
(33) 2,2-bis(ethylthio)-2-phenylethane
(34) Bis(ethylthio)diphenylmethane
(35) 2,2-bis(ethylthio)-2-cyclohexylethane
(36) 3,3-bis(ethylthio)pentane By substituting in the foregoing detailed illustrative examples of the process of the invention a mixture of two or more different phenolic compounds for the phenolic reactant there is obtained, under otherwise substantially identical conditions, a reaction mixture comprising a compound having the nuclei of two different phenolic radicals directly attached to a single carbon atom. Thus, the reaction of a mixture of phenol and 2-tert-butyl-5-methylphenol with 2,2-bis(butylthio)propane in the presence of anhydrous hydrogen chloride at a temperature of from about 20 to about 50° C. results in a reaction mixture comprising substantial amounts of 2-(4-hydroxyphenyl)-2-(3 - tert - butyl-6-methyl-4-hydroxyphenyl)propane which is separable therefrom by conventional separating means comprising one or more such steps as filtration, distillation, fractional crystallization and the like. Similarly 2-(4-hydroxyphenyl) - 2-(2,3-dimethyl-4-hydroxyphenyl)propane is prepared by reacting a mixture of phenol and 2,3-dimethylphenol with 2,2-bis(ethylthio)propane.

The process of the invention may be executed in batch, semi-continuous, or continuous operation. The reaction may be carried out in any suitable type of apparatus comprising a reaction zone enabling intimate contact of reactants and maintenance of the reaction conditions. The reaction zone employed may comprise a zone of enlarged cross-sectional area, such as, for example, a reaction chamber, or autoclave, and/or a zone of restricted cross-sectional area such as, for example, a tubular reactor or coil, the outside surface of which is preferably in contact with a heat controlling medium. Suitable means are provided for maintaining reactants in intimate contact with each other. Reaction chambers may be provided with suitable stirring means, or the reaction mixture may be maintained in a state of agitation by provision of suitable means for maintaining a circulating stream thereof through the reaction zone. Due to the absence of any substantial amount of water in the system, readily available and less costly materials of construction, such as, for example, carbon steels, may be employed in apparatus suitable for carrying out the process of the invention.

The reaction products comprising the bis(hydroxyphenyl)alkane is passed from the reaction zone into a suitable product separating zone. The absence of any substantial amount of water in the reaction mixture renders relatively easy the process of product separation which may comprise one or more such steps as, for example, stratification, decantation, distillation, fractionation, solvent extraction, extractive distillation, and the like. Unconverted reactants such as, for example, phenolic charge material, bis(alkylthio)alkanes, and residual acidic agent, such as hydrogen chloride, which are separated from the reaction mixture may be returned to the reaction zone.

The claimed invention is:

1. The process for the production of a bis(hydroxyphenyl) compound which comprises reacting a mercaptol with a phenolic compound in an acidic medium.

2. The process for the production of a gem(hydroxyphenyl)alkane which comprises reacting a gem(alkylthio)alkane with a phenolic compound in an acidic medium.

3. The process for the production of a gem(hydroxyphenyl)alkane which comprises reacting a gem(alkylthio)alkane with a phenolic compound in an acidic medium at a temperature of from about 0° C. to about 150° C.

4. The process for the production of gem(hydroxy-alkylphenyl)alkanes which comprises reacting a gem(alkylthio)alkane with an alkyl-substituted phenol in the presence of a strong mineral acid.

5. The process in accordance with claim 4 wherein said strong mineral acid is anhydrous hydrogen chloride.

6. The process in accordance with claim 4 wherein said gem(alkylthio)alkane is a bis(alkylthio)methane.

7. The process for the production of gem(hydroxyphenyl)alkanes which comprises reacting a gem(butylthio)alkane with phenol in the presence of hydrogen chloride.

8. The process for the production of hydroxyphenyl-substituted alkanes wherein the nuclei of two phenolic radicals are attached to a single carbon atom of the alkyl group which comprises reacting a dialkyl mercaptol with a phenolic compound in an acidic medium.

9. The process for the production of a hydroxyalkylphenyl-substituted alkane wherein the nuclei of two phenolic radicals are attached to a single carbon atom of the alkyl group which comprises reacting a gem(alkylthio)alkane with an alkyl-substituted phenol in the presence of a strong mineral acid.

10. The process in accordance with claim 9 wherein said gem(alkylthio)alkane is diethyl mercaptol.

11. The process for the production of a gem(hydroxyphenyl)alkane which comprises reacting a gem(alkylthio)alkane with phenol in the presence of an acid acting agent.

12. The process in accordance with claim 11 wherein said acid acting condensing agent is hydrogen chloride.

13. The process in accordance with claim 11 wherein said gem(alkylthio)alkane is a gem(butylthio)alkane.

14. The process for the production of gem(hydroxyphenyl)propane which comprises reacting a gem(alkylthio)propane with a phenolic compound in an acidic medium.

15. The process for the production of 2,2-bis(4-hydroxyphenyl)propane which comprises reacting a 2,2-bis(alkylthio)propane with phenol in an acidic medium.

16. The process in accordance with claim 15 wherein said reaction is executed in the presence of hydrogen chloride.

17. The process for the production of 2,2-bis(4-hydroxyphenyl)propane which comprises reacting 2,2-bis(butylthio)propane with phenol in the presence of an acid reacting condensing agent at a temperature of from about 0° C. to about 150° C.

18. The process in accordance with claim 17 wherein said acid reacting condensing agent is hydrogen chloride.

19. The process for the production of 2,2-bis(4-hydroxyphenyl)propane which comprises reacting 2,2-bis(butylthio)propane with phenol in the presence of a strong mineral acid at a temperature of from about 20° C. to about 80° C.

20. The process for the production of a bis(hydroxyphenyl) compound which comprises reacting a bis(organo-mercapto)methane with a phenolic compound in an acidic medium.

DANIEL B. LUTEN, JR.
SEAVER A. BALLARD.
CARL G. SCHWARZER.

REFERENCES CITED

The following references are of record in the file of this patent:

FOREIGN PATENTS

| Number | Country | Date |
|--------|---------|------|
| 630,758 | Great Britain | Oct. 20, 1949 |